(12) United States Patent
Liu et al.

(10) Patent No.: US 9,081,769 B2
(45) Date of Patent: Jul. 14, 2015

(54) PROVIDING TRANSLATION ASSISTANCE IN APPLICATION LOCALIZATION

(75) Inventors: Mindy Liu, Beijing (CN); Haibin Xie, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/386,819

(22) PCT Filed: Nov. 25, 2011

(86) PCT No.: PCT/CN2011/082947
§ 371 (c)(1),
(2), (4) Date: Jan. 24, 2012

(87) PCT Pub. No.: WO2013/075332
PCT Pub. Date: May 30, 2013

(65) Prior Publication Data
US 2014/0249797 A1     Sep. 4, 2014

(51) Int. Cl.
*G06F 17/20* (2006.01)
*G06F 17/28* (2006.01)
*G06F 17/27* (2006.01)
*G06F 17/22* (2006.01)

(52) U.S. Cl.
CPC .......... *G06F 17/289* (2013.01); *G06F 17/2288* (2013.01); *G06F 17/2854* (2013.01)

(58) Field of Classification Search
USPC ................................................. 704/1, 5, 8, 9
See application file for complete search history.

(56) References Cited

U.S. PATENT DOCUMENTS

| | | | |
|---|---|---|---|
| 6,275,790 B1 * | 8/2001 | Yamamoto et al. ................ | 704/8 |
| 6,442,516 B1 * | 8/2002 | Lee et al. ........................... | 704/8 |
| 6,782,529 B2 * | 8/2004 | Kumhyr ......................... | 717/111 |
| 7,171,352 B2 * | 1/2007 | Chang et al. ....................... | 704/9 |
| 7,207,005 B2 * | 4/2007 | Lakritz ........................... | 715/201 |
| 7,441,184 B2 * | 10/2008 | Frerebeau et al. ............. | 715/234 |
| 7,447,624 B2 * | 11/2008 | Fuhrmann ......................... | 704/8 |
| 7,552,452 B2 * | 6/2009 | McHugh et al. ............... | 719/331 |
| 7,580,951 B2 * | 8/2009 | Blair-Stanek ......................... | 1/1 |
| 7,908,260 B1 * | 3/2011 | Bushee ........................... | 707/705 |
| 7,957,954 B2 | 6/2011 | Chen et al. | |

(Continued)

FOREIGN PATENT DOCUMENTS

WO     2010129391 A1     11/2010

OTHER PUBLICATIONS

International Search Report and Written Opinion dated Sep. 6, 2012 for PCT International Application No. PCT/CN2011/082947, 6 pages.

*Primary Examiner* — Edgar Guerra-Erazo
(74) *Attorney, Agent, or Firm* — Remarck Law Group PLC

(57) ABSTRACT

Methods and systems for providing translation assistance are disclosed. A method includes: storing translation data representing changes to translations during a time interval between a first time and a second time; building the source code project into a reference application in the second language, comprising: replacing an identifier of each text message in the source code project with a translation of the text message in the second language made at the second time, and for a text message whose translation has changed during the time interval, inserting the identifier of the text message whose translation has changed as hidden information associated with the translation of the text message; and rendering the reference application for presentation to a user for translation checking, including highlighting the text messages that have an associated hidden identifier.

20 Claims, 4 Drawing Sheets

(56) References Cited

U.S. PATENT DOCUMENTS

| | | | |
|---|---|---|---|
| 8,671,389 B1* | 3/2014 | Buryak et al. | 717/109 |
| 2002/0123878 A1* | 9/2002 | Menke | 704/2 |
| 2002/0123879 A1* | 9/2002 | Spector | 704/2 |
| 2003/0084401 A1* | 5/2003 | Abel et al. | 715/501.1 |
| 2003/0126559 A1* | 7/2003 | Fuhrmann | 715/513 |
| 2003/0135358 A1* | 7/2003 | Lissauer et al. | 704/2 |
| 2003/0135501 A1* | 7/2003 | Frerebeau et al. | 707/100 |
| 2004/0056894 A1* | 3/2004 | Zaika et al. | 345/762 |
| 2004/0064807 A1* | 4/2004 | Rose et al. | 717/145 |
| 2004/0128614 A1* | 7/2004 | Andrews et al. | 715/501.1 |
| 2004/0168132 A1* | 8/2004 | Travieso et al. | 715/536 |
| 2004/0237044 A1* | 11/2004 | Travieso et al. | 715/530 |
| 2006/0156278 A1* | 7/2006 | Reager | 717/104 |
| 2008/0295009 A1* | 11/2008 | Huang et al. | 715/764 |
| 2011/0231181 A1 | 9/2011 | Furuuchi et al. | |
| 2011/0283261 A1* | 11/2011 | Yun | 717/124 |

* cited by examiner

| msgID | English Text | Chinese | Japanese |
|---|---|---|---|
| 12111 | start | 启动 | 開始 |
| 12116 | review | 审核 | 評論 |
| 12135 | save as | 存储为 | |
| 12156 | edit | 编辑 | 校訂 |
| ... | ... | ... | ... |

FIG. 3A

| msgID | English text | Type | Previous CN | Current CN |
|---|---|---|---|---|
| 12111 | start | modified | 启动 | 开始 |
| 12116 | review | modified | 审核 | 评论 |
| 11303 | add to cart | newly added | | 添加到购物车 |
| 11054 | video publishing | not translated | | |
| ... | ... | ... | ... | ... |

FIG. 3B

PROVIDING TRANSLATION ASSISTANCE IN APPLICATION LOCALIZATION

BACKGROUND

This specification relates to providing translation assistance in localizing applications in different languages.

Many software development companies design software applications so that they can be adapted to various languages and regions in order to account for regional differences and technical requirements of their target markets without requiring engineering changes. After the development of such software applications, a process called localization can be performed to, e.g., create different language or regional versions of the same software application. During localization, locale-specific components can be added and text messages displayed in the user interfaces of the application can be translated into the target language. In order to ensure efficiency in translating these text messages into different target languages, software developers can insert message identifiers in places in the source code where text messages are to be placed and maintain a list of all the text messages that are to be used in a source language so that the text messages can be translated into different languages. When these text messages have been translated into a selected target language, the source code can be compiled or built into a version of the application in the selected target language by replacing all the message identifiers in the source code with the translations in the selected language of the corresponding text messages.

Using the above approach, translators may need to translate the text messages by going through a list of text messages stored separately from the application. Further, for some software developers, some of the same text messages may be used in multiple software development projects. The same text message may be translated differently in different software projects, depending on the particular context in which it is used or the translator doing the translation. That is, the translation of a text message in the list of text messages may be changed over time.

SUMMARY

In general, one aspect of the subject matter described in this specification can be embodied in methods that include the actions of: storing, in a translation repository, translation data representing changes made to translations during a time interval between a first time and a second time, the translation data identifying text messages in a first language, respective identifiers for each of the text messages, and corresponding translations of a plurality of the text messages into a second language; including one or more of the respective identifiers in a source code project; generating a list of message change data that identifies, for each of one or more of the text messages, a translation of the text message into the second language made at the first time, a different translation of the text message into the second language made at the second time, and a type of translation change for the text message between the first time and the second time, wherein the type of translation change is one of modified, newly added, or not translated; building the source code project into a reference web application in the second language, comprising: replacing the identifier of each text message in the source code project with the translation of the text message into the second language made at the second time, and for a text message whose translation has changed during the time interval, inserting the identifier of the text message whose translation has changed as hidden information associated with the translation of the text message, wherein the identifier for a text message whose translation has not changed during the time window is not inserted as hidden information associated with the translation of the text message in the reference web application; and rendering the reference web application for presentation to a user for translation checking, including highlighting the text messages that have an associated hidden identifier, and, for each highlighted text message, embedding a gadget associated with the highlighted text message in the rendered reference application, wherein the gadget is operable to present a comparison between the translation of the highlighted text message made at the first time and the different translation of the highlighted text message made at the second time to the user.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

In general, another aspect of the subject matter described in this specification can be embodied in methods that include the actions of: storing, in a translation repository, translation data representing changes to translations during a time interval between a first time and a second time, the translation data identifying text messages in a first language, respective identifiers for each of the text messages, and corresponding translations of a plurality of the text messages into a second language; including one or more of the respective identifiers in a source code project; building the source code project into a reference application in the second language, comprising: replacing the identifier of each text message in the source code project with a translation of the text message in the second language made at the second time, and for a text message whose translation has changed during the time interval, inserting the identifier of the text message whose translation has changed as hidden information associated with the translation of the text message, wherein the identifier for a text message whose translation has not changed during the time window is not inserted as hidden information associated with the translation of the text message in the reference application; and rendering the reference application for presentation to a user for translation checking, including highlighting the text messages that have an associated hidden identifier.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The translation data can be represented as a list. The method can further include generating message change data that identifies, for a particular text message, a translation of the particular text message in the second language made at the first time and a translation of the particular text message in the second language made at the second time. The message change data can be represented as a list. Generating the message change data can further include: generating data identifying a type of translation change for the particular text message between the first time and the second time. The type of translation change can be one of: modified, newly added, or not translated. Rendering the reference application for presentation to a user can include, for each highlighted text message, embedding a gadget associated with the highlighted text message in the rendered reference application, wherein the gadget is operable to present a comparison between the translation of the highlighted text message at the first time and the translation of the highlighted text message at the second time to the user. Embedding a gadget associated with the highlighted text message in the rendered reference application can include: generating a user interface element that, in response to a user input, displays the translation of the highlighted text message made at the first time in conjunction with the translation of the highlighted text message made at the second time. The reference application can be a web application. The web application can include a plurality of web pages, and the method can further include: generating a report for each web page in the web application, wherein the report includes summary information regarding translation changes on the page.

Particular embodiments of the subject matter described in this specification can be implemented so as to realize one or more of the following advantages. Translators can be given contextual knowledge of how texts that are to be translated are used in a built application in order to translate these texts more accurately. Translators can use different translations of the same text message as references when translating a text message for a particular new software project. Translators for software localization can be given a clear knowledge of the translations of a particular text message over time and get an intuitive view of the user interfaces in which this text message is actually displayed and used.

BRIEF DESCRIPTION OF THE DRAWINGS

FIG. 3A shows an example translation repository which stores text messages for use in building applications according to embodiments of the described subject matter.

FIG. 3B is an example table of translation information processed based on information in the translation repository as shown in FIG. 3A according to embodiments of the described subject matter.

Like reference numbers and designations in the various drawings indicate like elements.

DETAILED DESCRIPTION

Figure 1:
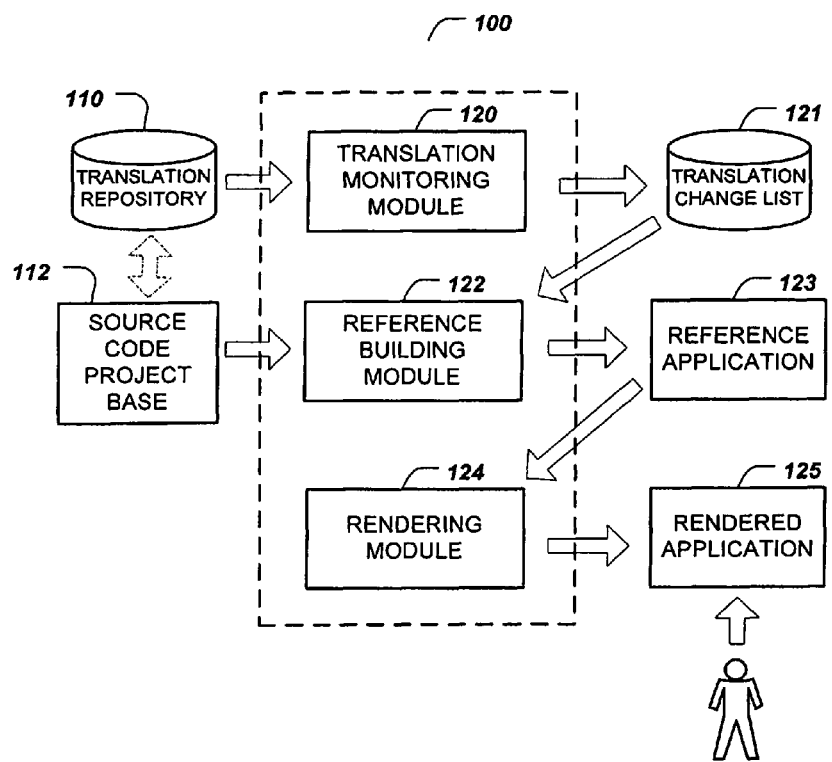
FIG. 1 shows an example system for providing translation assistance in application localization according to embodiments of the described subject matter.

FIG. 1 shows an example system 100 for providing translation assistance in application localization according to embodiments of the described subject matter. The system 100 can be implemented on one or more computers in one or more physical locations and can include a translation monitoring module 120, a reference building module 122 and a rendering module 124. The partitioning of the functionality of the system 100 between the translation monitoring module 120, the reference building module 122 and the rendering module 124 is illustrative only. Additional partitioning of the functions described below can be implemented, or, alternatively, the system 100 can be a single software engine that performs all the functions described below.

A translation repository 110 and a source code project base 112 can be connected to or accessible by the system 100. The translation repository 110 can contain translation data to be used in building different language versions of target applications based on a specific source code project stored in the source code project base 112. In some implementations, the source code project base 112 contains multiple source code projects under development within a software development company, and the translation repository 110 is used to store translations in different languages of the text messages that can be used in building a source code project in the source code project base 112 into localized applications, e.g., versions of the application in various target languages.

The translation repository 110 can store translations of a text message in multiple languages. These translations may be provided by translators based on the text messages in a source language, such as English, using, e.g., a separate translation assistance utility. This translation assistance utility can be a web application that displays the text messages on a web page and asks the translators to input translations into a selected target language and stores these translations in the translation repository once the translation has been confirmed. The translations provided by the translators to the translation repository may be managed by a version control system, e.g., Perforce, CVS or Microsoft Visual Sourcesafe. Additional functionalities can be provided in the translation assistance utility to allow different translators to check the translations provided by other translators, compare the translations of some text messages with previous translations of similar text messages, and so on.

The source code projects stored in the source code project base 112 have specific message identifiers in places where text messages that are to be displayed in user interfaces of the application are to be inserted. Each of these message identifiers, together with their respective corresponding text messages in a source language, e.g., English, can be recorded in the translation repository 110 as entries to be translated. After translation of all the text messages of a finalized source code project into a specific target language, e.g., Chinese, has been completed, this source code project can be built into an application in the target language by replacing all the message identifiers in the source code project with translations in the target language, e.g., Chinese, and then compiling this source code into an executable program. In some implementations, this executable program may be a web application, for example, a web application running at the server side, a web application with rich functionalities at the client side implemented by JavaScript functions, and so on.

The translation monitoring module 120 can monitor changes in the translation repository 110 for the text messages used in a specific source code project over a specified time interval and produce a translation change list 121 that records the translation differences during this time interval. The time interval may be specified by a user, e.g., a translator that desires to translate texts in the source code project. For example, a translator may wish to find the translation differences in one or more particular target languages of the text messages for a particular source code project between, e.g., one week ago and the current time. Alternatively, the time interval may be between a first previous time, e.g., two weeks ago, and a second previous time, e.g., one week ago. In some implementations, the user may specify the time interval by, e.g., identifying a previous version of the application in that language. The system can then generate a time interval between the time the translations used in the previous version of the application were generated and the current time, for example.

Based on this translation change list 121, the reference building module 112 of the system can build the source code project stored in the source code project base 112. The build can keep, for further processing, the message identifiers of each of the text messages that have been found to undergo a change during the time interval in the application. This technique for building the source code project can be referred to as a "reference build."

The result of the above noted "reference build" technique is a reference application 123. The reference application 123 can be rendered by the rendering module 124 of the system 100 to present particular functionality in the rendered application 125 to the translators. The translators can then review the various translations that have undergone a change during the specified time interval in a user environment to ensure that each text message has been translated properly. Functionality may be provided to the translators in the rendered application 125 that allows the translators to make further changes to the translations of the text messages that need to be revised in the displayed user environment of the application.

Figure 2:
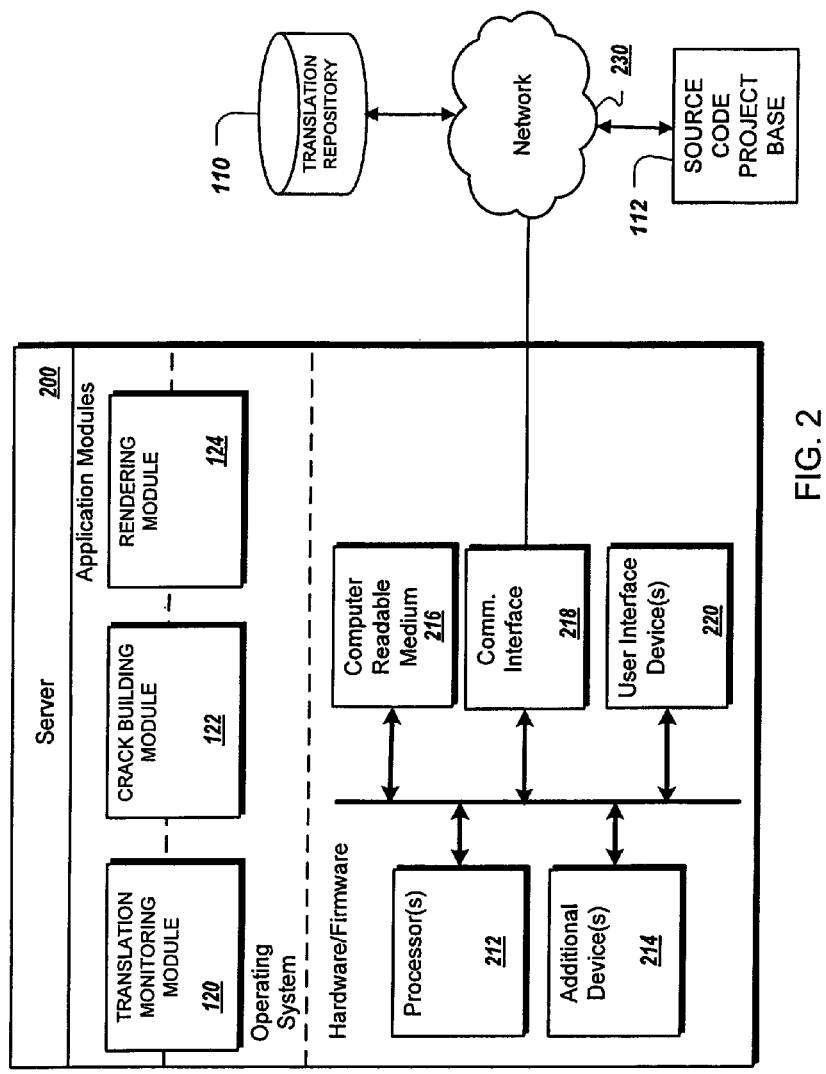
FIG. 2 is a schematic view of an example server system for providing translation assistance in application localization according to embodiments of the described subject matter.

FIG. 2 is a schematic view of an example server system for providing translation assistance in application localization according to embodiments of the described subject matter. The example server in FIG. 2 can include a layer of hardware or firmware structure, including one or more processors 212, a computer readable medium 216, a communication interface 218 which communicates with other computers via the network 230, user interface devices 220 and any additional devices 214. Besides the hardware or firmware that supports the operation of the server 200, specific application modules for providing translation assistance in application localization can also be running on an operating system in the server 200. These application modules may include a translation module 120, a reference building module 122 and a rendering module 124. In some implementations, the server 200 is connected to a network 230 and monitors, through the translation monitoring module 120, translation changes in the translation repository 110 via the network 230. The reference building module 122 of the server 200 can reference build a source code project received from the source code project base 112 over the network 230 using information in a translation change list that has been created on the server 200 as a result of monitoring changes to the translation repository 110. After this reference building process has been completed, the rendering module 124 can render this reference application on the server 200 to the translators for further review of translations of text messages displayed in the various user interfaces of the application. Alternatively, any one or both of the translation repository 110 and the source code project base 112 may be located on the same server 200.

FIG. 3A shows an example translation repository which stores text messages for use in building applications according to embodiments of the described subject matter. In the example translation repository, each text message in a source language may have a unique identifier, which can be used in a source code project to signify that the text message or a translation of this text message into a particular language should be placed in an appropriate position in the code of the source code project. Each text message in the translation repository may have a translation in one or more languages. In this example, the first entry in the translation repository is the text message "start", which is uniquely identified by the message id "12111" and has a translation in both Chinese and Japanese. Similarly, the text messages "review", "save as", and "edit" all have respective unique identifiers and may or may not already have their corresponding translations in Chinese and Japanese. It should be noted that each text message may be a word, a phrase, a sentence or even multiple sentences, and that the translation of a particular text message into a target language may not have already been provided in a target language at a particular time. Also, the techniques described in this specification operate in an environment in which any changes made to the translations of the text messages will be managed by a system that tracks versions of the text messages, e.g., a version control system, so that the times when the changes were made and the previous translations can be readily retrieved by querying the system.

FIG. 3B is an example table of translation information processed by the translation monitoring module based on information in the translation repository as shown in FIG. 3A according to embodiments of the described subject matter. This may be a table created for a particular source code project when a system, e.g., the system 100 of FIG. 1, runs to provide translation assistance in localizing this particular source code project. Each entry in this table is information relating to a text message in the translation repository as shown in FIG. 3A whose translation into a particular language has undergone some change. For example, this table may contain the translation changes in Chinese of the translation repository shown in FIG. 3A for all the text messages used in a specific source code project between a week ago and the current time. This table includes a field "msgID" for keeping the message identifiers of the text messages that have seen some change in the past week or other interval. A field "Type" is used to specify the particular type of change that the translations of the text messages have undergone. It should be noted that even though this table is called a "translation change table", this name is used for convenience only since, in addition to recording the text messages that have actually changed over the time interval, this table can also record those text messages that do not yet have any translations at a particular time. Thus, the types of translation change may include: "modified", "newly added" and "not translated". The type "modified" means that the translation of the same text message has changed over this time period. For example, in this table, the text message "start" was translated as "启动" in Chinese a week ago, but it has been changed to "开始" in Chinese since that time. The type "newly added" (for example, for the text message "add to cart" in FIG. 3B) refers to those text messages that did not exist in the translation repository a week ago, but were added by someone for the project at issue within the last week, e.g., because the source code project has been changed and new text messages were added to the source code project. The type "not translated" is used to refer to those text messages for the same project that have not yet been translated into the target language. In the table in FIG. 3B, the text message "video publishing" has not yet been translated and was recorded in this translation change list as "not translated". Further, the change list can contain fields that store the respective translations at the previous time and at the present time, respectively. As shown in FIG. 3B, the translation of the text message "review" was "审核" in Chinese one week ago, but it has been changed and is now "评论" in Chinese.

Generally, the translation change list as shown in FIG. 3A can record the translation information in a target language of all the text messages for a particular source code project that are to be reviewed by a translator, including those text messages that are to be translated for the first time. Further, this translation change list may, for a particular text message, contain information regarding translation changes of the text message in more than one target language. In that case, separate fields for the type of translation change, the previous translation and the current translation can be included for each such additional language. In some implementations, the translation change list contains another field that assigns a new message identifier to each text message in the translation change list to be used in the reference application, i.e., in addition to the message identifiers that are identical to those stored in the translation repository as shown in FIG. 2A. By using these text message identifiers, the system will be freed from having to use the message identifiers inherited from the translation repository that may not be suitable to be distinctively embedded in the reference application for later use by the rendering module.

Figure 4:
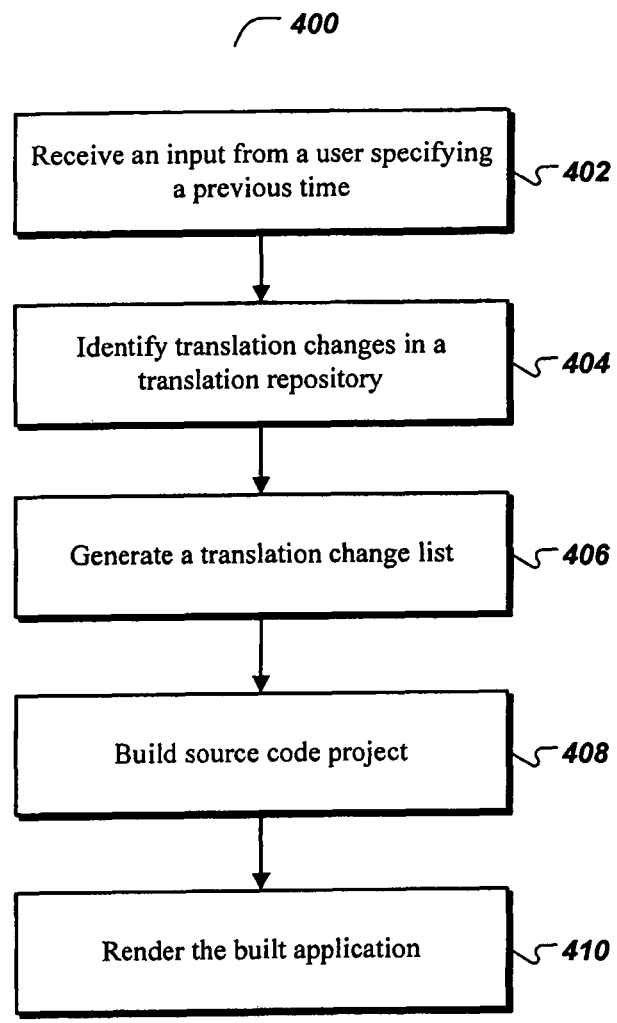
FIG. 4 is a flow chart illustrating an example process for providing translation assistance in application localization according to embodiments of the described subject matter.

FIG. 4 is a flow chart illustrating an example process 400 for providing translation assistance in application localization according to embodiments of the described subject matter. The process 400 can be performed by a system of one or more computers located in one or more locations. For example, the system 100 of FIG. 1 can be used to perform the process 400.

At step 402, the user may specify one or more particular previous times as an input to the translation assistance system. For example, a translator may wish to find the translation differences in one or more particular target languages of the text messages for a particular source code project between one week ago and the current time or between three weeks ago and one week ago. The particular source code project may also be specified by the user, or can be set by the system by default if only one source code project is available. Alternatively, the user may, e.g., identify a previous version of the source code project in order to obtain translation differences between the previous version of the source code project and the current version of the source code project.

The translation monitoring module of the system will, based on this input, identify translation changes during a time interval defined by the one or more particular times by querying the version control system currently managing the changes on the translation repository (step 404). Since a version control system is configured to record any changes to a resource over the time, those skilled in the art will readily understand that obtaining the changes at a resource managed by a version control system between two different times can be implemented by employing conventional techniques. Translation changes of text messages in the translation repository for the particular project can therefore be monitored by comparing the translations of text messages in the translation repository at a first specified time with translations of text messages in the translation repository at second specified time, e.g., by using logged change information in the version control system. Further, the translation monitoring module may be configured to accept, input from a user specifying a single previous time, since the information regarding the translation changes in the translation repository is mostly valuable to a translator between, a previous time and the current time. Alternatively, the translation monitoring module may also be configured to accept input specifying a time interval defined by two previous times.

At step 406, the system generates a translation change list for the translations of text messages in the source code project in one or more specific target languages. The generated translation change list may be, for example, in the form described above with reference to FIG. 3B. As noted previously, a new message identifier field may be created in the translation change list for each text message that has undergone a change in order to keep it distinctively identifiable when rendering the application after being "reference built" by the reference building module. For example, the new message identifier may have 10 characters, starting with a letter and following by a sequence of nine digits, etc. Various different schemes for constructing this new message identifier may be used to facilitate the later identification of these message identifiers when rendering the reference built application, which can be, e.g., a server side web application. In some implementations, a translation change list may be created for a specific source code project each time a translator wants to check the translation changes in the project and runs the system. In addition to the text messages that have been "changed", the translation change list may also contain all the text messages used in the project, wherein the text messages that remain the same between the specified time period can be noted as "unmodified" and kept as they are in the list. In an alternative implementation, a translation change list may be created for multiple source code projects. At step 408, the system builds the source code project into an application executable on the rendering module using the information contained in the translation change list. In some implementations, the source code project may be a web application, such as one written in JSP (Java Server Pages), Visual Basic, etc. In building the executable application, the system can search the source code project and replace all the message identifiers in the project with the current translation of the corresponding text messages in the target language by consulting the translation change list. For those text messages that have been modified, newly added, or not translated, the message identifiers, the text messages in the source language, and the previous translation and the current translation in the target language can be embedded in the particular places in the HTML code where these text messages are located. For example, for the text message "start", if it is used in the source HTML code in the form of "<label>12111</label>", and its translation in Chinese has been modified during the specified time interval, new custom attributes can be created for the label "<label>" that will retain this change information. For example, after the reference building process, the above segment of source code may be changed to "<label msgID="12111" previousTranslation="启动 " currentTranslation="开始 " changeType="modified">开始 </label>"

In this way, the translation change information is maintained after the reference building process. In alternative implementations, the identifier for the target language and any other relevant information may also be embedded in appropriate places in the built application by using custom attributes for the various labels in the web application that can contain text messages. Further, those skilled in the art will appreciate that similar techniques can be employed to embed the translation change information of the text messages in other places in the source code project, e.g., other than between the HTML tags.

After the source code application has been reference built into an executable application, the system can proceed to render the executable application for presentation to a user for translation checking (step 410). In some implementations, the system can retrieve the translation change information by checking the HTML tags in the dynamically created web page to find those with the specific custom attributes "msgID". The system can highlight the text messages that have been modified by inserting further HTML tags around these text messages. Further, the system can embed other advanced functionalities near the text message in the displayed web page, for example, using other HTML tags or JavaScript code, to present the previous translation to the translator, e.g., a dropdown box, a popup window, or other user interface element, which can be triggered by clicking a special icon near the displayed text message.

In this way, the translator can easily find the text messages in the displayed web page that have undergone a change and can check the previous translations. The translator is also able to review these translations in the actual user environment to therefore ensure that the meaning of each text message has been translated properly. In alternative implementations, the system can further embed other capabilities which enable the translator to make further changes to the translations of the displayed text messages that need be to revised in the user environment of the application, e.g., instead of having to go to the specific interfaces to the translation repository or translation change list to make such revisions. Further, the system may also be configured to include reporting functionalities that present a summary of translation changes of a particular project or of multiple projects.

Embodiments of the subject matter and the functional operations described in this specification may be implemented in digital electronic circuitry, in tangibly-embodied computer software or firmware, in hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions may be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, or a combination of one or more of them. A computer program (which may also be referred to as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device; e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   storing, in a translation repository and by a computing device having one or more processors, translation data representing changes made to translations during a time interval between a first time and a second time, the translation data identifying text messages in a first language, respective identifiers for each of the text messages, and corresponding translations of a plurality of the text messages into a second language;
   including, by the computing device, one or more of the respective identifiers in a source code project;
   generating, by the computing device, a list of message change data that identifies, for each of one or more of the text messages, a translation of the text message into the second language made at the first time, a different translation of the text message into the second language made at the second time, and a type of translation change for the text message between the first time and the second time, wherein the type of translation change is one of modified, newly added, or not translated;
   building, by the computing device, the source code project into a reference web application in the second language, comprising:
      replacing the identifier of each text message in the source code project with the translation of the text message into the second language made at the second time, and
      for a text message whose translation has changed during the time interval, inserting the identifier of the text message whose translation has changed as hidden information associated with the translation of the text message, wherein the identifier for a text message whose translation has not changed during the time window is not inserted as hidden information associated with the translation of the text message in the reference web application; and
   rendering, by the computing device, the reference web application for presentation to a user for translation checking, including highlighting the text messages that have an associated hidden identifier, and, for each highlighted text message, embedding a gadget associated with the highlighted text message in the rendered reference application, wherein the gadget is operable to present a comparison between the translation of the highlighted text message made at the first time and the different translation of the highlighted text message made at the second time to the user.

2. A computer-implemented method comprising:
   storing, in a translation repository and by a computing device having one or more processors, translation data representing changes to translations during a time interval between a first time and a second time, the translation data identifying text messages in a first language, respective identifiers for each of the text messages, and corresponding translations of a plurality of the text messages into a second language;
   including, by the computing device, one or more of the respective identifiers in a source code project;
   building, by the computing device, the source code project into a reference application in the second language, comprising:
      replacing the identifier of each text message in the source code project with a translation of the text message in the second language made at the second time, and
      for a text message whose translation has changed during the time interval, inserting the identifier of the text message whose translation has changed as hidden information associated with the translation of the text message, wherein the identifier for a text message whose translation has not changed during the time window is not inserted as hidden information associated with the translation of the text message in the reference application; and
   rendering, by the computing device, the reference application for presentation to a user for translation checking, including highlighting the text messages that have an associated hidden identifier.

3. The method of claim 2, wherein the translation data is represented as a list.

4. The method of claim 2, further comprising generating, by the computing device, message change data that identifies, for a particular text message, a translation of the particular text message in the second language made at the first time and a translation of the particular text message in the second language made at the second time.

5. The method of claim 4, wherein the message change data is represented as a list.

6. The method of claim 4, wherein generating the message change data further comprises:
   generating data identifying a type of translation change for the particular text message between the first time and the second time.

7. The method of claim 6, wherein the type of translation change is one of: modified, newly added, or not translated.

8. The method of claim 2, wherein rendering the reference application for presentation to a user comprises, for each highlighted text message, embedding a gadget associated with the highlighted text message in the rendered reference application, wherein the gadget is operable to present a comparison between the translation of the highlighted text message at the first time and the translation of the highlighted text message at the second time to the user.

9. The method of claim 8, wherein embedding a gadget associated with the highlighted text message in the rendered reference application comprises:

generating a user interface element that, in response to a user input, displays the translation of the highlighted text message made at the first time in conjunction with the translation of the highlighted text message made at the second time.

10. The method of claim 2, wherein the reference application is a web application.

11. The method of claim 10, wherein the web application comprises a plurality of web pages, the method further comprising: generating a report for each web page in the web application, wherein the report includes summary information regarding translation changes on the page.

12. A system, comprising:
one or more computers; and
one or more storage devices storing instructions that, when executed by the one or more computers, cause the one or more computers to perform operations comprising:
storing, in a translation repository, translation data representing changes to translations during a time interval between a first time and a second time, the translation data identifying text messages in a first language, respective identifiers for each of the text messages, and corresponding translations of a plurality of the text messages into a second language,
including one or more of the respective identifiers in a source code project;
building the source code project into a reference application in the second language, comprising:
replacing the identifier of each text message in the source code project with a translation of the text message in the second language made at the second time, and
for a text message whose translation has changed during the time interval, inserting the identifier of the text message whose translation has changed as hidden information associated with the translation of the text message, wherein the identifier for a text message whose translation has not changed during the time window is not inserted as hidden information associated with the translation of the text message in the reference application; and
rendering the reference application for presentation to a user for translation checking, including highlighting the text messages that have an associated hidden identifier.

13. The system of claim 12, wherein the translation data is represented as a list.

14. The system of claim 12, the operations further comprising generating message change data that identifies, for a particular text message, a translation of the particular text message in the second language made at the first time and a translation of the particular text message in the second language made at the second time.

15. The system of claim 14, wherein generating the message change data further comprises:
generating data identifying a type of translation change for the particular text message between the first time and the second time.

16. The system of claim 15, wherein the type of translation change is one of: modified, newly added, or not translated.

17. The system of claim 12, wherein rendering the reference application for presentation to a user comprises, for each highlighted text message, embedding a gadget associated with the highlighted text message in the rendered reference application, wherein the gadget is operable to present a comparison between the translation of the highlighted text message at the first time and the translation of the highlighted text message at the second time to the user.

18. The system of claim 17, wherein embedding a gadget associated with the highlighted text message in the rendered reference application comprises:
generating a user interface element that, in response to a user input, displays the translation of the highlighted text message made at the first time in conjunction with the translation of the highlighted text message made at the second time.

19. The system of claim 12, wherein the reference application is a web application.

20. The system of claim 19, wherein the web application comprises a plurality of web pages, the operations further comprising: generating a report for each web page in the web application, wherein the report includes summary information regarding translation changes on the page.

* * * * *